United States Patent
Aiba (10) Patent No.: US 7,518,808 B2
(45) Date of Patent: Apr. 14, 2009

(54) DIAPHRAGM DEVICE

(75) Inventor: Daigo Aiba, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 0 days.

(21) Appl. No.: 11/826,155

(22) Filed: Jul. 12, 2007

(65) Prior Publication Data

US 2008/0018976 A1    Jan. 24, 2008

(30) Foreign Application Priority Data

Jul. 14, 2006    (JP)    .......................... P 2006-194002

(51) Int. Cl.
*G02B 15/14*    (2006.01)
*G03B 9/08*    (2006.01)

(52) U.S. Cl. ...................... 359/704; 396/450

(58) Field of Classification Search ............. 359/704, 359/739–740; 396/449, 450, 505

See application file for complete search history.

(56) References Cited

U.S. PATENT DOCUMENTS 5,459,544 A * 10/1995 Emura .................... 396/505
6,924,946 B2 * 8/2005 Watanabe et al. ........... 359/739
2003/0147642 A1    8/2003 Nishimoto
2004/0240879 A1    12/2004 Negishi et al.

FOREIGN PATENT DOCUMENTS

| JP | 9-281546 A | 10/1997 |
|----|------------|---------|
| JP | 11-142906 A | 5/1999 |
| JP | 11-231190 A | 8/1999 |
| JP | 2003-233102 A | 8/2003 |
| KR | 10-2006-0061291 A | 6/2006 |

* cited by examiner

*Primary Examiner*—Alicia M Harrington
(74) *Attorney, Agent, or Firm*—Birch, Stewart, Kolasch & Birch, LLP (57) ABSTRACT

A diaphragm device is provided and includes: a diaphragm mechanism having a diaphragm vane and a diaphragm frame receiving the diaphragm vane; a diaphragm-mechanism cover fixed to a lens barrel to which the diaphragm mechanism is attached, the diaphragm-mechanism cover clamping the diaphragm mechanism with a receiving surface of the lens barrel. The diaphragm mechanism and the diaphragm-mechanism cover are inserted in the lens barrel through a side surface of the lens barrel, and a part of the diaphragm mechanism and a part of the diaphragm-mechanism cover protruding outward relative to the side surface of the lens barrel. The diaphragm device further includes a supporting member in a portion of the diaphragm mechanism protruding outward relative to the side surface of the lens barrel, the supporting member supporting the diaphragm mechanism in a direction of the diaphragm mechanism detachable from the lens barrel.

6 Claims, 7 Drawing Sheets

DIAPHRAGM DEVICE

BACKGROUND OF THE INVENTION

1. Field of the Invention

The present invention relates to a diaphragm device.

2. Description of Related Art

Recently, monitor cameras (monitor CCTV cameras) are broadly used, for example, at financial-institution branches or locations and retail stores. The monitor camera is equipped with a lens unit (lens barrel) similarly to the usual camera. In the lens unit, a diaphragm device is arranged to regulate the amount of incident light. The diaphragm device is structured with precision components, including diaphragm vanes, a lever for moving the vanes, a driver device for electrically operating the lever (see, for example, JP-A-2003-233102).

However, in the event that vibration or an impact is applied to the diaphragm device, a component, e.g. the vane or the driver device, falls off the diaphragm device. Where such vibration or an impact is significant, the diaphragm device itself is possibly detached from the lens device.

Particularly, in a certain case, the monitor camera in its nature is possibly to be broken by a person who is not desired to be taken an image of by the monitor camera. For this reason, there is a need to improve the resistance to an impact force as compared to the usual camera.

In case the monitor camera is damaged at its diaphragm device, imaging is no longer available properly because of the impossibility to regulate the amount of light. In this case, the monitor camera is not allowed to exhibit its monitor function.

SUMMARY OF THE INVENTION

An object of an illustrative, non-limiting embodiment of the present invention is to provide a diaphragm device improved in the resistance to vibration, impacts and so on.

According to an aspect of the invention, there is provided a diaphragm device comprising: a diaphragm mechanism having a diaphragm vane and a diaphragm frame receiving the diaphragm vane; a diaphragm-mechanism cover fixed to a lens barrel to which the diaphragm mechanism is attached, the diaphragm-mechanism cover clamping the diaphragm mechanism with a receiving surface of the lens barrel. The diaphragm mechanism and the diaphragm-mechanism cover are inserted in the lens barrel through a side surface of the lens barrel, and a part of the diaphragm mechanism and a part of the diaphragm-mechanism cover protruding outward relative to the side surface of the lens barrel. The diaphragm device further comprises a supporting member in a portion of the diaphragm mechanism protruding outward relative to the side surface of the lens barrel, the supporting member supporting the diaphragm mechanism in a direction of the diaphragm mechanism detachable from the lens barrel.

According to the above structure, the diaphragm mechanism and the diaphragm-mechanism cover are to be inserted in the lens barrel, in a state that at least a part thereof protrudes relative to the side surface of the lens barrel. The diaphragm-mechanism cover is fixed to the lens barrel on which the diaphragm mechanism is attached, to clamp the diaphragm mechanism with the surface of the receiving surface of the lens barrel. The diaphragm-mechanism cover is provided with a supporting member in a portion of the diaphragm mechanism protruding outward relative to the side surface of the lens barrel and for supporting the diaphragm mechanism in a direction of the diaphragm mechanism detachable from the lens barrel. In the event that a force is applied by vibration, an impact or the like in the direction of the diaphragm mechanism detachable from the lens barrel, the diaphragm mechanism is clamped between the diaphragm-mechanism cover and the receiving surface of the lens barrel. Because the diaphragm mechanism is supported by the supporting member of the diaphragm-mechanism cover in the direction of the diaphragm mechanism detachable from the lens barrel, the diaphragm mechanism is positively prevented from falling off the lens barrel.

Meanwhile, the support member may be in abutment against an end surface of the diaphragm mechanism, in the direction of the diaphragm mechanism detachable from the lens barrel. According to the structure, because the support member is in abutment against an end surface of the diaphragm mechanism in the direction of the diaphragm mechanism detachable from the lens barrel, the diaphragm mechanism can be positively suppressed from falling off the lens barrel.

Meanwhile, the support member may be provided in a manner surrounding an outer periphery of the diaphragm mechanism, in the portion of the diaphragm mechanism protruding outward relative to the side surface of the lens barrel. According to the structure, because the support member is provided in a manner surrounding an outer periphery of the diaphragm mechanism, the diaphragm mechanism can be supported positively. Even in the event that vibration, an impact or the like is applied, the diaphragm mechanism can be suppressed from falling off the lens barrel.

Meanwhile, the diaphragm vane may be opposed to one surface of the diaphragm-mechanism cover, a falling-off preventing rail being provided protruding from the one surface of the diaphragm cover toward the diaphragm vane and for regulating the vane from moving vertically to a surface thereof. According to the structure, because the diaphragm vane is regulated from moving vertically to the surface of the diaphragm vane by means of the falling-off preventing rail, the diaphragm vane can be positively suppressed from falling off the diaphragm frame even when vibration, an impact or the like is applied.

Meanwhile, the diaphragm mechanism may be attached to the diaphragm frame and has drive means for driving the diaphragm vane, the drive means having an engage unit that engages with the diaphragm frame when attached to the diaphragm frame, the diaphragm frame having an opening in which the engage unit is inserted, the engage unit being to deform in a course of being inserted in the opening and engage with an edge of the opening due to a restoration from deformation, the diaphragm-mechanism cover having a rib protruding toward the opening, the rib being provided in a direction the engage unit of deforming and in a position close to the engage unit when the diaphragm mechanism and the diaphragm-mechanism cover are attached to the lens barrel. According to the structure, because the diaphragm-mechanism cover has a rib in the direction of the engage unit deforming and in a position close to the engage unit, the engage unit is suppressed from deforming by the abutment between the engage unit and the rib. Accordingly, the engage unit is positively prevented from deforming and going into disengagement from the opening edge. Even in the event that vibration, an impact or the like is applied, the drive means is positively suppressed from being detached from the diaphragm mechanism.

BRIEF DESCRIPTION OF THE DRAWINGS

The features of the invention will appear more fully upon consideration of the exemplary embodiment of the invention, which are schematically set forth in the drawings, in which.

DETAILED DESCRIPTION OF THE EXEMPLARY EMBODIMENTS

Although the invention will be described below with reference to the exemplary embodiments thereof, the following exemplary embodiments and modifications do not restrict the invention.

According to an exemplary embodiment of the invention, a novel, improved diaphragm device can be provided which is improved in the resistance to vibration, an impact or the like.

With reference to the drawings, explanation will be made in detail below on an exemplary embodiment according to the present invention. Note that, in the specification and drawings, the constituent element having substantially the same functional structure is attached with the same reference numeral, and omitted to explain duplicatedly.

Figure 1:
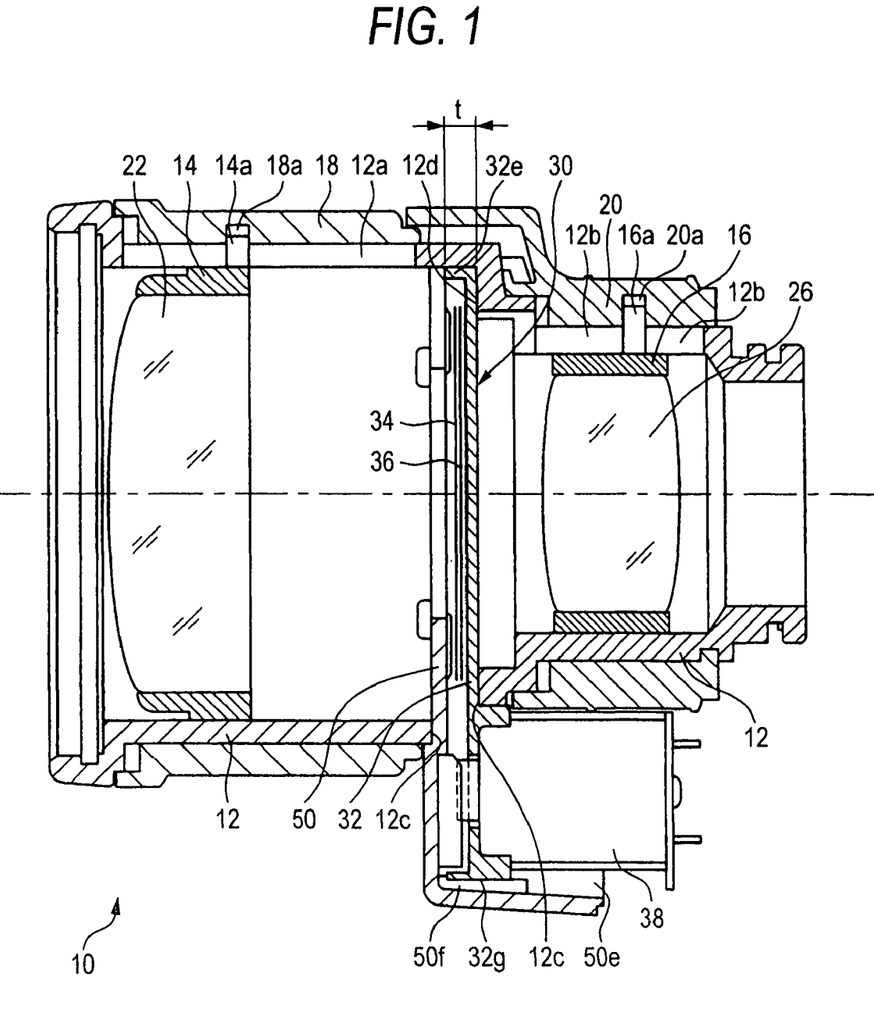
FIG. 1 is a sectional view showing a lens unit having a diaphragm device according to an exemplary embodiment of the present invention.

FIG. 1 is a sectional view showing a lens unit (barrel) having a diaphragm mechanism according to an exemplary embodiment of the invention, illustrating a vertical section taken along the optical axis P thereof. As shown in FIG. 1, the lens unit 10 has a fixed cylinder 12. The fixed cylinder 12 is provided with a diaphragm mechanism 30. In the interior of the fixed cylinder 12, a lens frame 14 is arranged in front of the diaphragm mechanism 30 (closer to the subject) while a lens frame 16 is arranged in back of the diaphragm mechanism 30. Meanwhile, a focus ring 18 and a zoom ring 20 are arranged outer of the fixed cylinder 12.

The lens frame 14 holds a focus lens (group) 22 therein. The lens frame 14 is arranged with an engagement pin 14a projecting relative to the peripheral surface thereof. Meanwhile, the fixed cylinder 12 is axially formed with a straight groove 12a. By fitting the engagement pin 14a in the straight groove 12a, the lens frame 14 and the focus lens 22 are guided along the straight groove 12a and moved straightly in the optical axial direction.

The lens frame 16 holds therein a zoom lens (group) 26. The lens frame 16 is arranged with an engagement pin 16a projecting relative to the peripheral surface thereof. Meanwhile, the fixed cylinder 12 is axially formed with a straight groove 12b. By fitting the engagement pin 16a in the straight groove 12b, the lens frame 16 and the zoom lens 26 are guided along the straight groove 12b and moved straightly in the optical axial direction.

The focus ring 18 is rotatably arranged over the outer peripheral surface of the fixed cylinder 12, in a position the lens frame 14 is arranged. The focus ring 18 has an inner peripheral surface in which a cam groove 18a is formed helically about the optical axis. The engagement pin 14a, attached on the lens frame 14, is in engagement with the cam groove 18a of the focus ring 18. Accordingly, rotating the focus ring 18 causes the intersection, between the cam groove 18a of the focus ring 18 and the straight groove 12a of the fixed cylinder 12, to displace axially. This causes the engagement pin 14a, lens frame 14 and focus lens 22 to axially displace in accordance with the intersection. In this manner, by rotating the focus ring 18, the focus lens 22 can be adjusted in position thus effecting focal adjustment.

The zoom ring 20 is rotatably arranged over the outer peripheral surface of the fixed cylinder 12, in a position the lens frame 16 is arranged. The zoom ring 20 has an inner peripheral surface in which a cam groove 20a is formed helically about the optical axis. The engagement pin 16a, attached on the lens frame 16, is in engagement with the cam groove 20a of the zoom ring 20. Accordingly, rotating the zoom ring 20 causes the intersection, between the cam groove 20a of the zoom ring 20 and the straight groove 12b of the fixed cylinder 12, to displace in the optical axial direction. This causes the engagement pin 16a, lens frame 16 and zoom lens 26 to axially displace in accordance with the intersection. In this manner, by rotating the zoom ring 20, the zoom lens 26 can be adjusted in position to adjust the focal length (zoom angle-of-view) thereof. Incidentally, although focus function was provided to the front-group lens while zoom function was to the rear-group lens in this embodiment, zoom function may be provided to the front-group lens while focus function be to the rear-group lens.

The diaphragm mechanism 30 has a diaphragm frame 32, two vanes 34, 36, a driver device (drive means) 38 for driving the vanes, and a lever 40 (not shown in FIG. 1) fixed on the dive shaft 38a of the driver device 38. Meanwhile, a diaphragm-mechanism cover 50 is arranged in front of the diaphragm mechanism 39, as shown in FIG. 1. The diaphragm mechanism 30 and the diaphragm-mechanism cover 50 constitute a diaphragm device of the embodiment.

Figure 2:
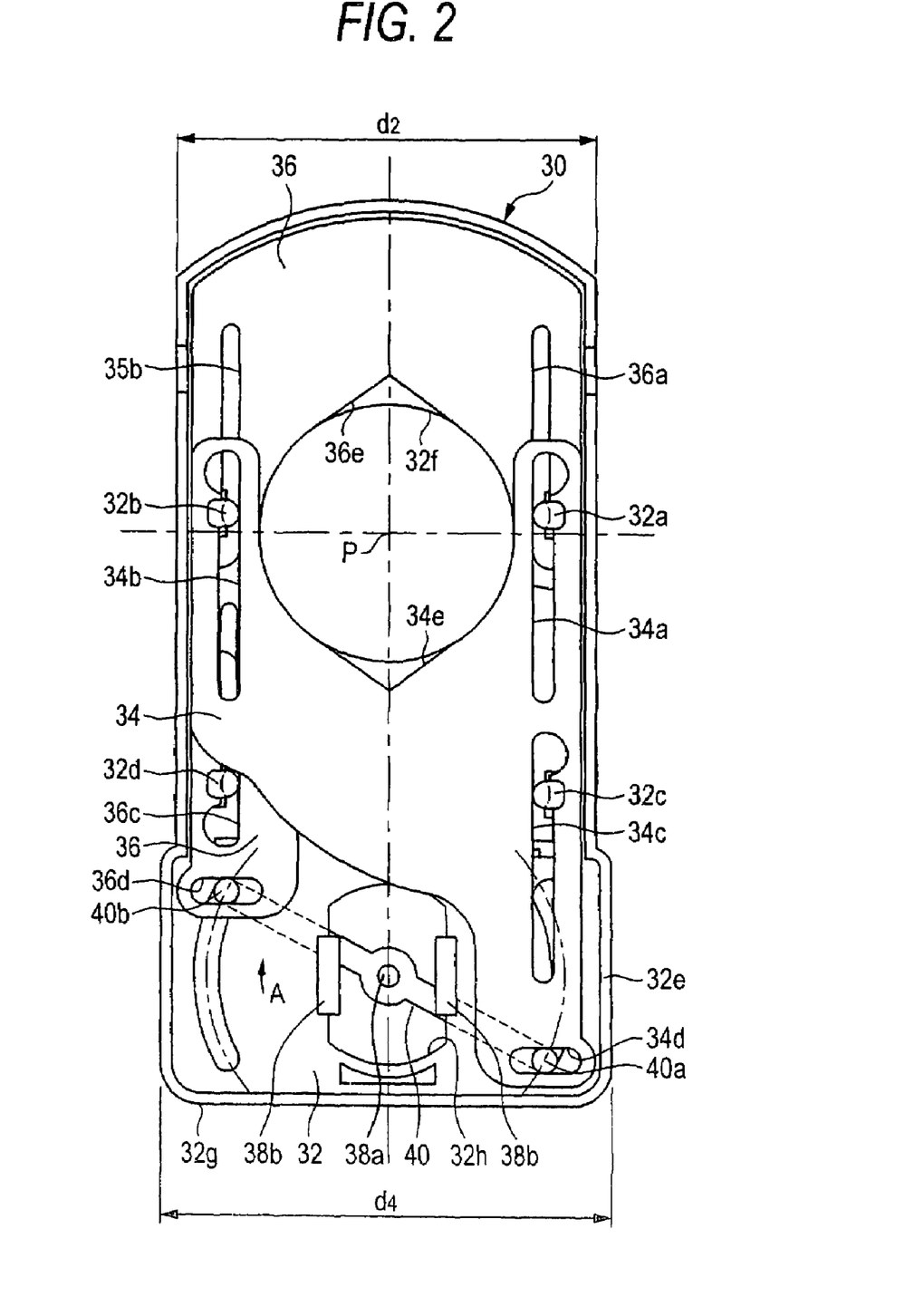
FIG. 2 is a view showing a planar structure of the diaphragm device.

FIG. 2 shows a planar structure of the diaphragm mechanism 30, illustrating a state as viewed from a side closer to the subject.

As shown in FIG. 2, the diaphragm mechanism 30 has the diaphragm frame 32. The diaphragm frame 32 is provided with an aperture 32f circular in form about the optical axis P and a rib 32e. The rib 32e is provided in a manner protruding toward the subject, in a peripheral edge of the diaphragm frame 32, as shown in FIGS. 1 and 2.

The vanes 34, 36 are arranged laid one over another at the inner side of the rib 32e, as shown in FIG. 2. The vane 34, located closer to the subject, is formed with elongate openings 34a, 34b, 34c. Meanwhile, the diaphragm frame 32 has engagement pins 32a, 32b, 32c, 32d that project toward the subject. The openings 34a, 34b, 34c are respectively in engagement with the three engagement pins 32a, 32b, 32c.

Likewise, the vane 36 is formed with openings 36a, 36b, 36c. The openings 36a, 36b, 36c are respectively in engagement with the three engagement pins 32a, 32b, 32d provided on the diaphragm frame 32. The engagement pins 32a, 32b, 32c, 32d are each made increased in diameter at the tip thereof in order to ensure the engagement with the vanes 34, 36.

The vane 34 is formed with a cutout 34e corresponding to the aperture 32f of the diaphragm frame 34. Meanwhile, the vane 36 is formed with a cutout 36e corresponding to the aperture 32f of the diaphragm frame 32.

As shown in FIG. 1, the driver device 38 is attached to a lower part of the diaphragm frame 32. The driver device 38 is attached from rear onto the diaphragm frame 32. As shown in FIG. 2, the drive shaft 38a of the driver device 38 is directed to the diaphragm frame 32, and the drive shaft 38a is attached with the lever 40. The lever 40 has engagement pins 40a, 40b at its both ends. The engagement pin 40a is engaged with the opening 34d formed in the vane 34 while the engagement pin 40b is with the opening 36d formed in the vane 36.

In FIG. 2, the lever 40 is shown in a state moved the greatest in the direction of the arrow A by means of the driver device 38. In this state, the vane 34 is in the lowermost position in FIG. 2 while the vane 36 is in the uppermost position. Accordingly, the cutout 34e of the vane 34 and the cutout 36e of the vane 36 are distant from each other to open the aperture 32f of the diaphragm frame 32, as shown in FIG. 2.

Meanwhile, when the lever 40 is moved in the opposite direction to the arrow A from the FIG. 2 state, the aperture given by the cutouts 34e, 36e becomes narrow. In the state the lever 40 is moved the greatest in the opposite direction to the arrow A, the vane 34 is in the uppermost position in FIG. 2 while the vane 36 is in the lowermost position. In this state, the vanes 34, 36 are overlapped completely to fully close the aperture 32f of the diaphragm frame 32.

As shown in FIG. 1, between the focus ring 18 and the zoom ring 20, an opening 12c is formed penetrating to the interior, in the fixed cylinder at a lower part of the outer periphery thereof. The diaphragm mechanism 30 is inserted together with the diaphragm-mechanism cover 50, in the interior of the fixed cylinder 12 through the openings 12c.

Figure 3A:
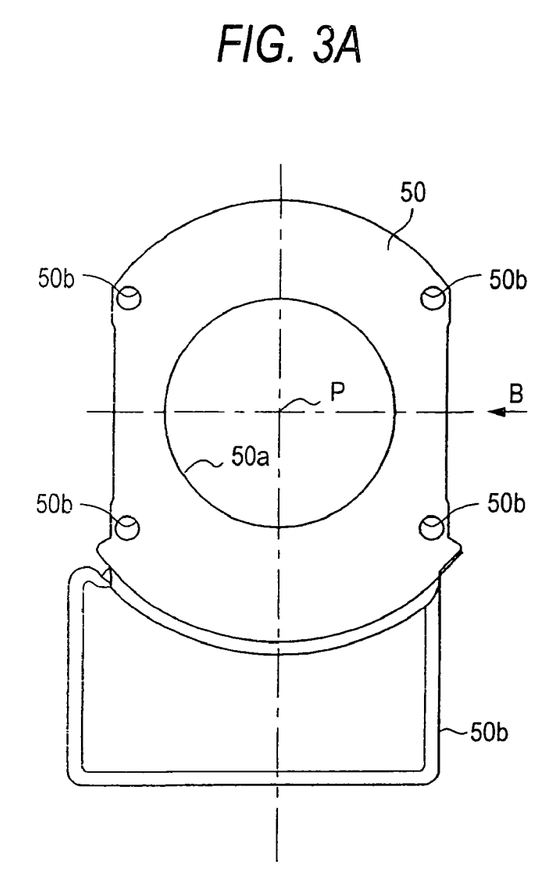
FIGS. 3A to 3C are views showing a structure of a diaphragm-mechanism cover.
Figure 3B:
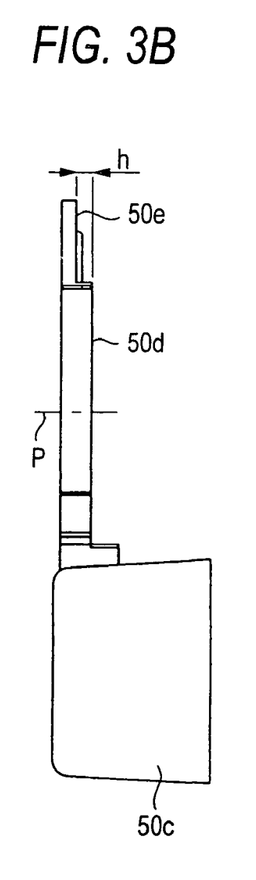
Figure 3C:
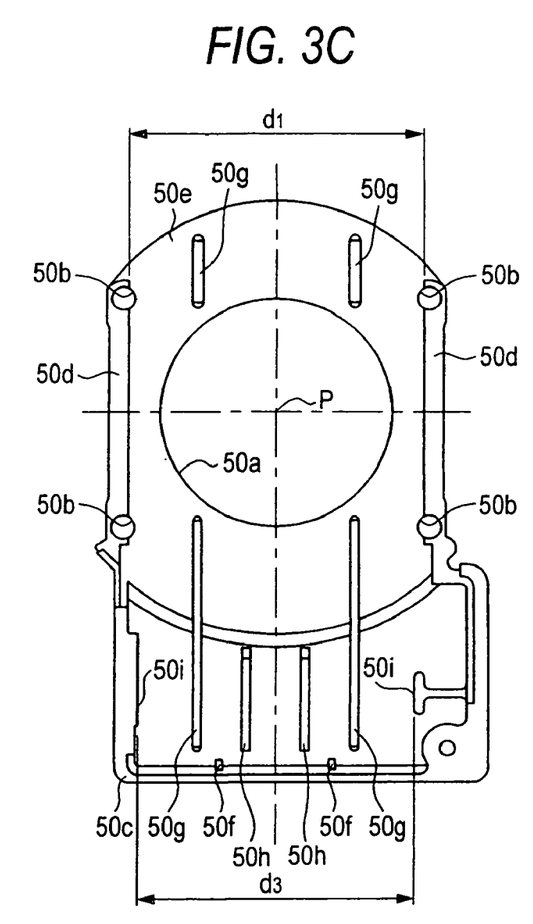

FIGS. 3A to 3C show a structure of the diaphragm-mechanism cover 50. FIG. 3A shows the diaphragm-mechanism cover 50 as viewed from the subject side while FIG. 3B shows the diaphragm-mechanism cover 50 as viewed in a direction of the arrow B in FIG. 3A. Meanwhile, FIG. 3C shows the diaphragm-mechanism cover 50 as viewed from the side of the diaphragm mechanism 30.

In this embodiment, the diaphragm-mechanism cover 50 has functions to prevent the diaphragm mechanism 30 from falling off the fixed cylinder 12, to prevent the vanes 34, 36 from falling off the diaphragm frame 32, and to prevent the driver device 38 from falling off the diaphragm frame 32.

First explained is the mechanism that prevents the diaphragm mechanism 30 from falling off the fixed cylinder 12. As shown in FIG. 3A, the diaphragm-mechanism cover 50 is formed through with an opening 50a about the optical axis P. In the diaphragm-mechanism cover 50, screw holes 50b are formed at four locations to insert fixing screws 52.

In the diaphragm-mechanism cover 50, a diaphragm-mechanism support frame (supporting member) 50c is provided extending rearward. The diaphragm mechanism 30 has a region, where the driver device 38 is attached, protruding outward of the fixed cylinder 12, as shown in FIG. 1. The diaphragm-mechanism support frame 50c is provided in a manner surrounding, at the below and both sides, the diaphragm mechanism 30 in its portion protruding lower than the fixed cylinder 12.

As shown in FIGS. 3B and 3C, diaphragm-mechanism cover 50 has an abutment surface 50d to abut against a receiving surface 12d of the fixed cylinder 12, on the side closer to the diaphragm mechanism 30. As shown in FIG. 3B, the diaphragm-mechanism cover 50 has a height "h", with respect to the direction of the optical axis P, of from its main surface 50e closer to the diaphragm mechanism to the abutment surfaces 50d. The height "h" corresponds to a thickness "t" of the diaphragm frame 32 at its rib 32e portion shown in FIG. 1.

The abutment surfaces 50d are structured such that the spacing d1 between the left and right ones shown in FIG. 3C is greater than a width d2 of the diaphragm frame 32 shown in FIG. 2. Incidentally, the spacing d1 between the abutment surfaces 50d may be structured equal to the width d2 of the diaphragm frame 32 so as to fit the diaphragm frame 32 between the abutment surfaces 50d.

Figure 4:
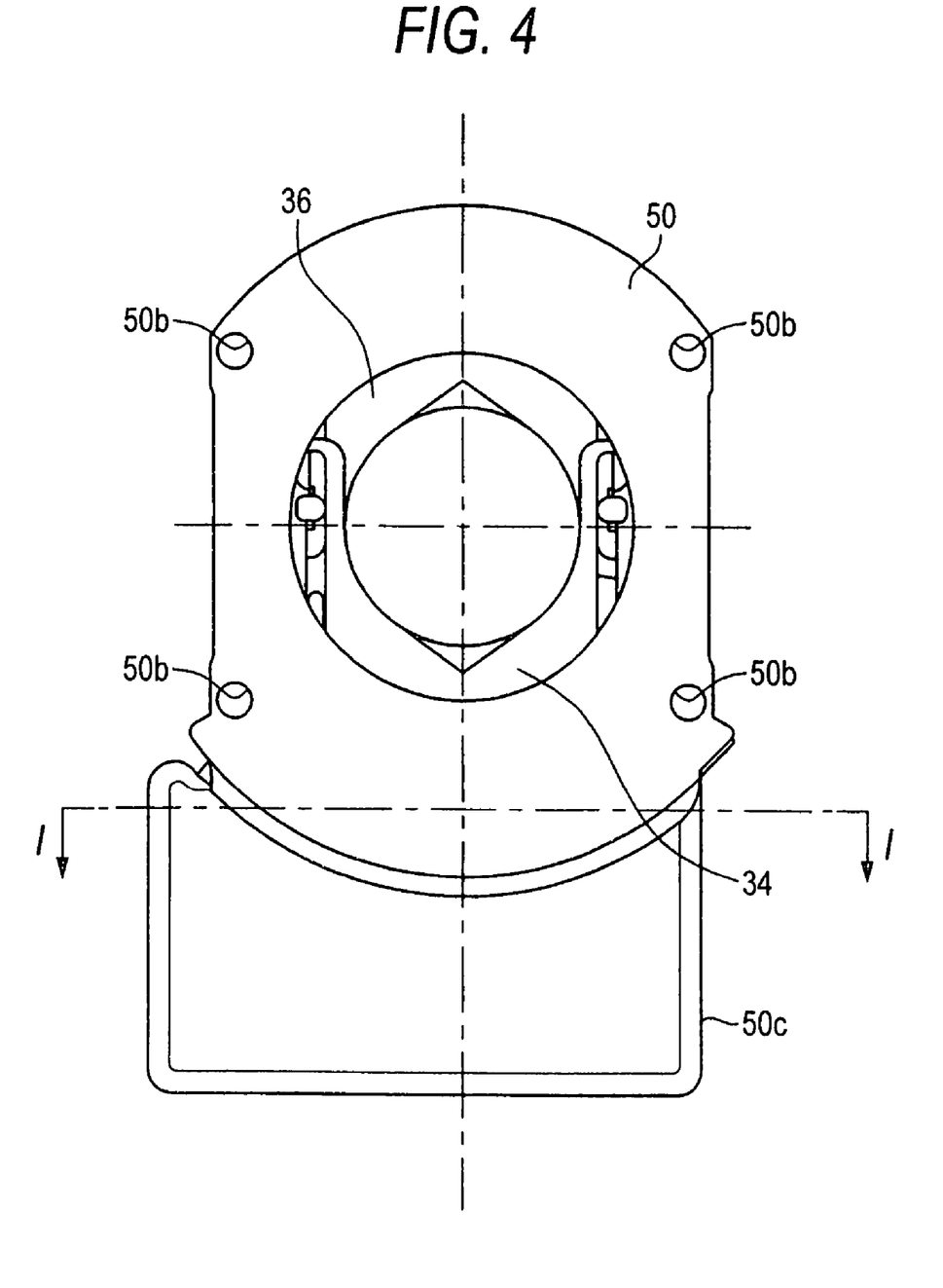
FIG. 4 is a view the diaphragm mechanism in a state put over with the diaphragm-mechanism cover, as viewed from the subject side.
Figure 5:
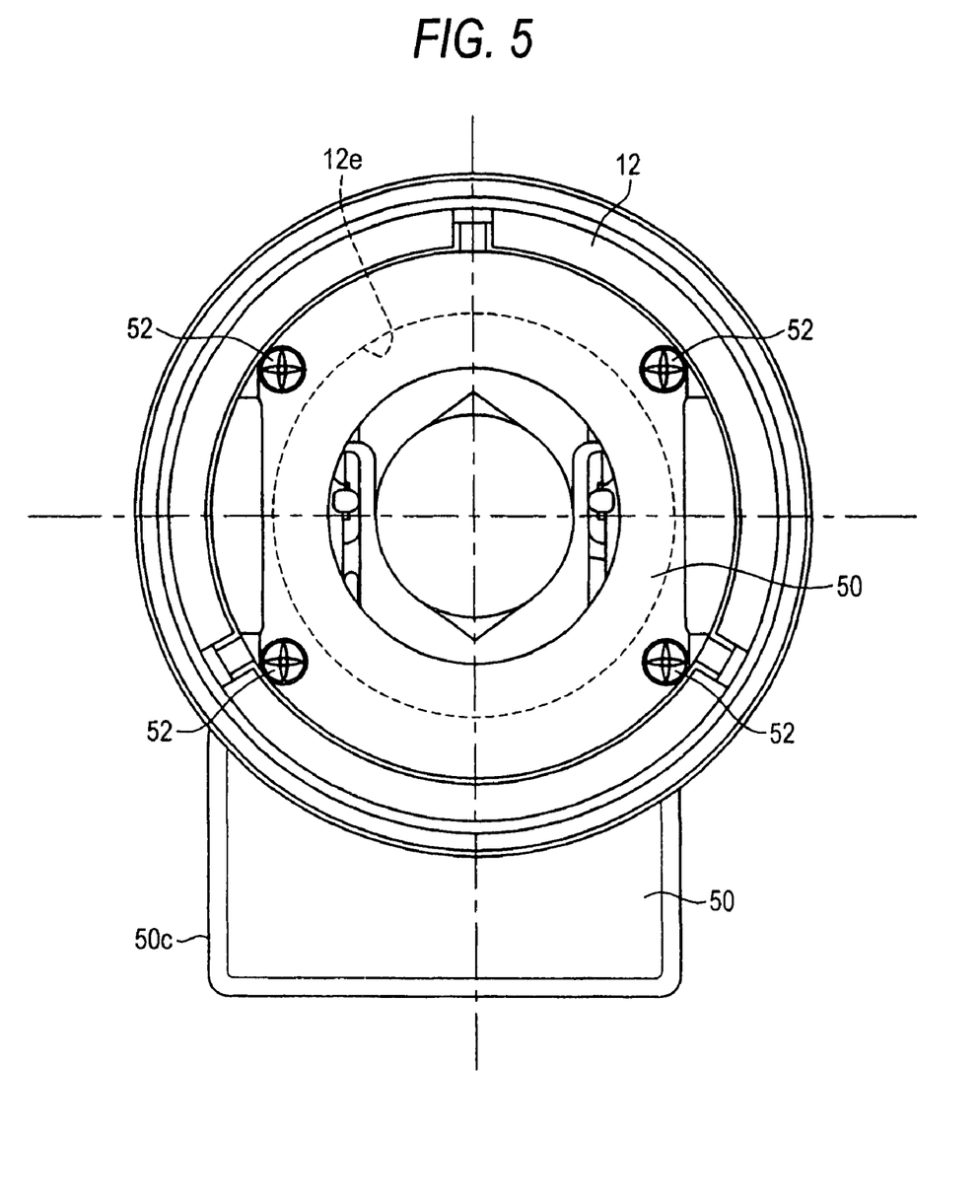
FIG. 5 is a view showing a combination of the FIG. 4 diaphragm mechanism and diaphragm-mechanism cover in a state attached on the fixed cylinder.

FIG. 4 shows the diaphragm mechanism 30 in a state covered with a diaphragm-mechanism cover 50, as viewed from the subject side. FIG. 5 shows a combination of the FIG. 4 diaphragm mechanism 30 and diaphragm-mechanism cover 50, in a state attached on the fixed cylinder 12.

As shown in FIG. 5, the diaphragm mechanism 30 and the diaphragm-mechanism cover 50 are inserted into the interior of the fixed cylinder 12 through the opening 12c of the fixed cylinder 12. In this state, the diaphragm mechanism 30 at its surface closer to the lens frame 16 abuts against the receiving surface 12d of the fixed cylinder 12, as shown in FIG. 1. Meanwhile, the diaphragm-mechanism cover 50 at its abutment surface 50d abuts against the receiving surface 12d of the fixed cylinder 12 while the rib 32e at its tip abuts against a main surface 50e of the diaphragm-mechanism cover 50. The diaphragm frame 32 has a thickness t corresponding to the height "h" of the diaphragm-mechanism cover 50 wherein the width d2 of the diaphragm mechanism 30 is smaller than the spacing d1 between the abutment surfaces 50d. Accordingly, the diaphragm mechanism 30, in its widthwise direction, is received in between the two abutment surfaces 50d and, in its optical axis P direction, is clamped between the main surface 50e of the diaphragm-mechanism cover 50 and the receiving surface 12d of the fixed cylinder 12.

As shown in FIG. 5, four fixing screws 52 are inserted in the screw holes 50b of the diaphragm-mechanism cover 50. The fixing screws 52 are screwed to the receiving surface 12d of the fixed cylinder 12. This fixes the diaphragm-mechanism cover 50 to the fixed cylinder 12. Simultaneously, the diaphragm mechanism 30 is fixedly clamped between the main surface 50e of the diaphragm-mechanism cover 50 and the receiving surface 12d of the fixed cylinder 12. Incidentally, in FIG. 5, the receiving surface 12d is shown at its inner peripheral end surface by the broken line 12e. The end face 12e is in a position radially closer to the optical axis P than the position the fixing screws 52 are screwed.

Figure 6:
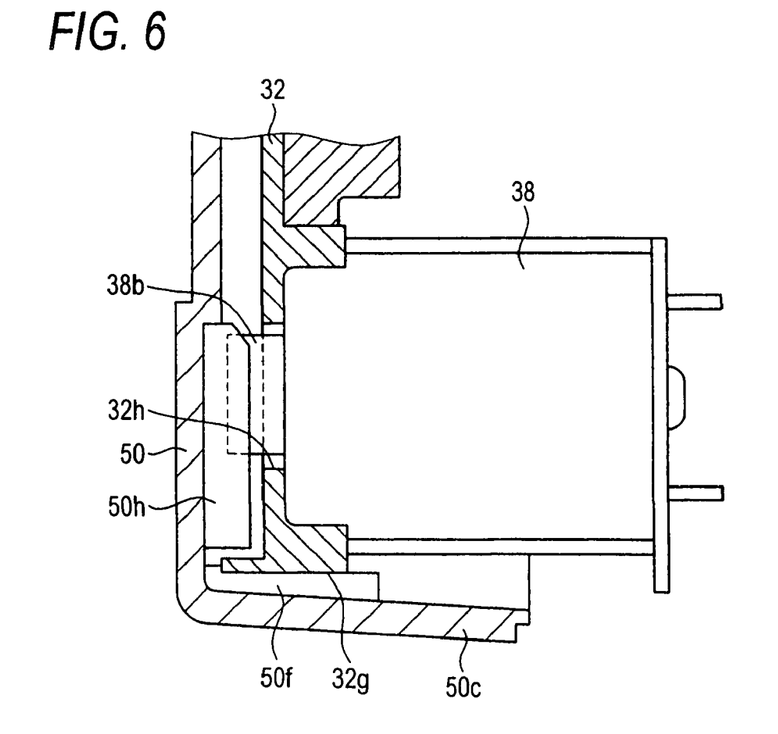
FIG. 6 is a view showing a FIG. 1 driver device and its neighborhood by magnification.

Meanwhile, the diaphragm mechanism 30 is supported surrounded by the diaphragm-mechanism support frame 50c of the diaphragm-mechanism cover 50, at its lower part extending from the lower end 32g of the diaphragm frame 32 to widthwise both-side regions thereof. FIG. 6 is a view showing the FIG. 1 driver device and its neighborhood by magnification, illustrating a state the lower end 32g of the diaphragm frame 32 is supported by the diaphragm-mechanism support frame 50c.

As shown in FIG. 6, a rib 50f is provided in an inner surface of the diaphragm-mechanism support frame 50c and in a direction toward the lower end 32g of the diaphragm frame 32. In the state the diaphragm mechanism 30 and the diaphragm-mechanism cover 50 are inserted in the fixed cylinder 12 and the fixed screws 52 are tightened, the diaphragm-mechanism cover 50 is fixed to the fixed cylinder 12. In this state, the rib 50f of the diaphragm-mechanism support frame 50c abuts against the lower end 32g of the diaphragm frame 32 so that the diaphragm mechanism 30 at its lower end (lower end 32g of the diaphragm frame 32) can be supported by the rib 50f. Meanwhile, the diaphragm mechanism 30 has a region, extending from the lower end 32g to the both sides, surrounded by the diaphragm-mechanism support frame 50c and supported by placing the spacing d3 between the abutment surfaces 50i of the inner surface of the diaphragm-mechanism support frame 50c (see FIG. 3C) in coincidence with the width d4 of the diaphragm frame 32 (see FIG. 2). Here, a rib may be provided in the inner surface of the diaphragm-mechanism support frame 50c, to abut against the widthwise both sides of the diaphragm frame 32.

Therefore, the diaphragm mechanism 30 is positively supported by the diaphragm-mechanism support frame 50c. The diaphragm mechanism 30 is suppressed from moving toward departing from the fixed cylinder 12 by means of the diaphragm-mechanism support frame 50c and the rib 50f. This can firmly hold the diaphragm mechanism 30 on the fixed cylinder 12. Even in the event that a great impact force is applied to the lens unit 10, the diaphragm mechanism 30 can be positively prevented from falling off the fixed cylinder 12.

Now explanation is made on the mechanism that prevents the vanes 34, 36 from falling off, in the present embodiment. In the main surface 50e of the diaphragm-mechanism support cover 50, vane falling-off preventing rails 50g are provided projecting toward the diaphragm mechanism 30. The vane falling-off preventing rails 50g are provided extending along the direction in which the vanes 34, 36 are driven. The vane-falling-off preventing rails 50g are defined in the height relative to the main surface 50e such that a predetermined clearance is provided between an upper surface of the vane-falling-off preventing rails 50g and the vane 34 located closer to the subject.

With this structure, even in the event that such an impact force is applied as to move the vans 34, 36 toward the subject (vertically to the surface of the vane 34, 36), the vanes 34, 36 go into abutment against the diaphragm vane-falling-off preventing rail 50g, thus being restricted from moving toward the subject. This can suppress the vanes 34, 36 from unnecessarily moving toward the subject. Therefore, disengagement can be prevented at between the openings 34a, 34b, 34c of the vane 34 and the engagement pins 32a, 32b, 32c and at between the openings 36a, 36b, 36c of the vane 36 and the engagement pins 32a, 32b, 32c. Meanwhile, disengagement can be prevented at between the opening 34d of the vane 34 and the engagement pin 40a of the lever 40 and at between the opening 36d of the vane 36 and the engagement pin 40b of the lever 40. This can prevent the vanes 34, 36 from falling off in the case an impact force is applied, thus ensuring the vanes 34, 36 to be rotated positively.

Figure 7:
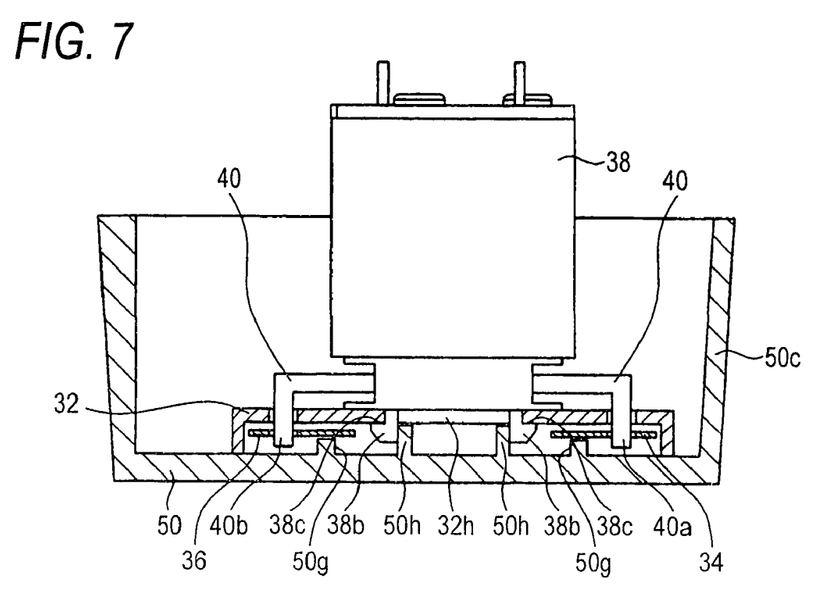
FIG. 7 is a view showing a section taken along the one-dot chain line I-I' in FIG. 4 wherein the diaphragm mechanism and the diaphragm-mechanism cover are fixed to the fixed cylinder.

Now explanation is made on the mechanism that support the driver device 38 on the diaphragm frame 32. FIG. 7 is a view showing a section taken along the one-dot chain line I-I' in FIG. 4, in the state that the diaphragm mechanism 30 and the diaphragm-mechanism cover 50 are fixed to the fixed cylinder 12. FIG. 7 shows mainly a joint region of between the driver device 38 and the diaphragm frame 32.

As shown in FIGS. 2 and 7, the driver device 38 is protruded with two engagers 38b extending toward the diaphragm frame 32. Meanwhile, the diaphragm frame 32 is provided with an opening 32h in which the engagers 38b are to be inserted. When joining the diaphragm 32 and the driver device 38 together, the engagers 38b of the driver device 38 are inserted in the opening 32h in the state the diaphragm-mechanism cover 50 is removed from the diaphragm mechanism 30.

On this occasion, the engagers 38b deform toward the center of the opening 32h when being inserted in the opening 32h. By returning to the former state, the engagers 38b at their engagement faces 38c come into engagement with the opening 32h at its edge. This joins the driver device 38 and the diaphragm frame 32 together.

Meanwhile, the diaphragm-mechanism cover 50 has two ribs 50h for preventing the driver device 38 from falling off, as shown in FIG. 7. When the driver device 38 is attached on the diaphragm frame 32 and then the diaphragm mechanism 30 and the diaphragm-mechanism cover 50 are mounted to the fixed cylinder 12, the falling-off preventing ribs 50h are inserted to between the two engagers 38b and abutted against the opposite surfaces of the two engagers 38b.

Figure 8:
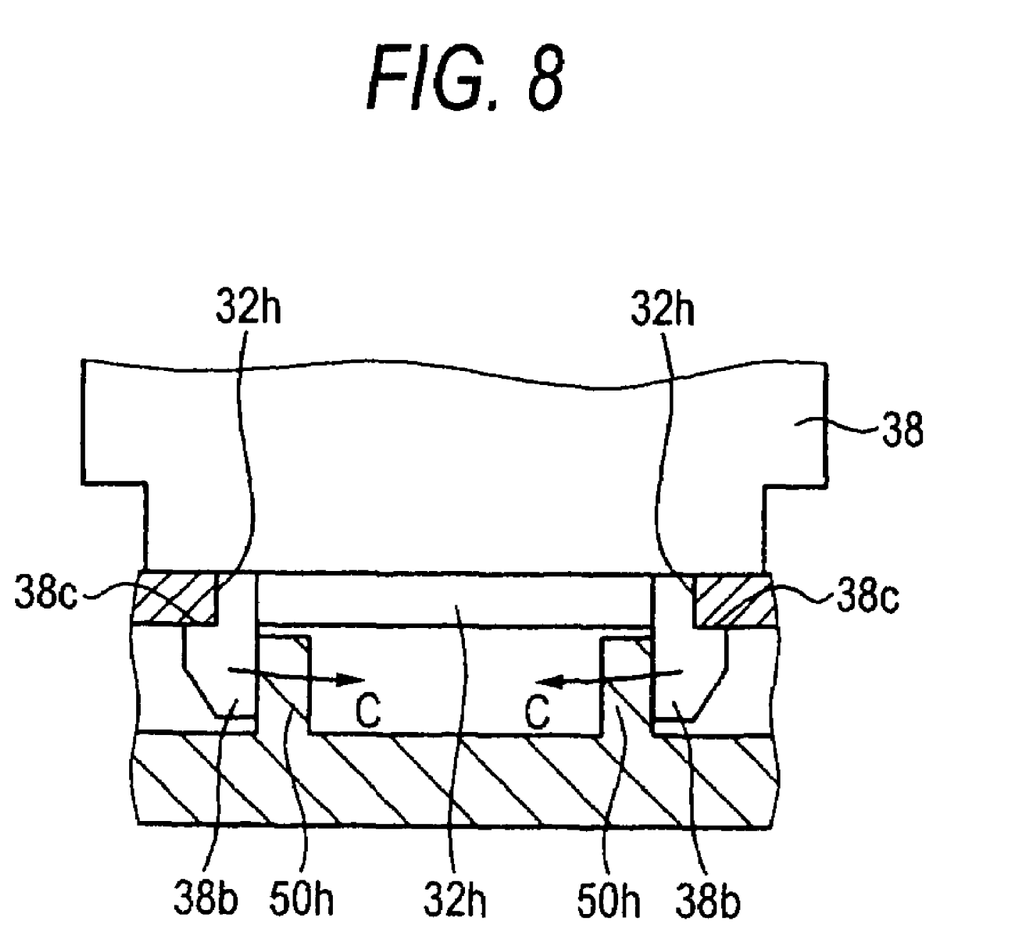
FIG. 8 is a view for explaining a function of the falling-off preventing rib.

FIG. 8 is a view for explaining the function of the falling-off preventing rib 50h. When the driver device 38 falls off the diaphragm frame 32, the engagers 38b deform in the direction to release the engagement of the engaging surface 38c and the opening 32h (in a direction of the arrow C in FIG. 8). In this case, in the embodiment, because the falling-off preventing ribs 50h are inserted in between the two engagers 38b and abutted against the opposite surfaces of the two engagers 38b, the engagers 38b do not deform in the direction toward the arrow C. Accordingly, there occurs no disengagement at between the engagement surface 38c and the opening 32h edge. Even in the event that a great impact force is applied to the lens unit 10, the driver device 38 can be positively suppressed from falling off the diaphragm mechanism 30.

As explained so far, the present embodiment can positively suppress the falling of the diaphragm mechanism 30 off the fixed cylinder 12, of the vanes 34, 36 off the diaphragm frame 32 and of the driver device 38 off the diaphragm frame 32. Therefore, it is possible to positively suppress the occurrence of a poor video image resulting from such falling off.

Although the preferred embodiment of the invention was explained so far while referring to the appended drawings, the invention is naturally not limited to the embodiment. The person skilled in the art apparently is to reach a revision or modification variously within the scope set forth in the claims, which are naturally construed belonged to the technical scope of the present invention.

This application claims foreign priority from Japanese Patent Application No. 2006-194002, filed Jul. 14, 2006, the entire disclosure of which is herein incorporated by reference.

What is claimed is:

1. A diaphragm device comprising:
   a diaphragm mechanism having a diaphragm vane and a diaphragm frame receiving the diaphragm vane;
   a diaphragm-mechanism cover fixed to a lens barrel to which the diaphragm mechanism is attached, the diaphragm-mechanism cover clamping the diaphragm mechanism with a receiving surface of the lens barrel; and
   wherein
   the diaphragm mechanism and the diaphragm-mechanism cover are inserted in the lens barrel through a side surface of the lens barrel, and a part of the diaphragm mechanism and a part of the diaphragm-mechanism cover protruding outward relative to the side surface of the lens barrel, and
   the diaphragm device further comprises a supporting member in a portion of the diaphragm-mechanism cover protruding outward relative to the side surface of the lens barrel, the supporting member supporting the diaphragm mechanism in a direction in which the diaphragm mechanism is detachable from the lens barrel, wherein the supporting member surrounds the part of the diaphragm mechanism protruding outward relative to the side surface of the lens barrel on at least two sides of the diaphragm mechanism, including an end surface of the diaphragm mechanism.

2. The diaphragm device according to claim 1, wherein the supporting member is in abutment against the end surface of the diaphragm mechanism, in the direction in which the diaphragm mechanism is detachable from the lens barrel.

3. The diaphragm device according to claim 1, wherein the support member surrounds an outer periphery of the diaphragm mechanism on at least four sides, in the portion of the diaphragm mechanism protruding outward relative to the side surface of the lens barrel.

4. The diaphragm device according to claim 1, wherein
the diaphragm vane is opposed to one surface of the diaphragm-mechanism cover, and
the diaphragm-mechanism cover has a falling-off preventing rail protruding from the one surface of the diaphragm-mechanism cover toward the diaphragm vane, the falling-off preventing rail regulating the diaphragm vane from moving vertically to a surface of the diaphragm vane.

5. The diaphragm device according to claim 1, wherein
the diaphragm mechanism is attached to the diaphragm frame and includes a drive device that drives the diaphragm vane,
the drive device includes an engaging unit that engages with the diaphragm frame when attached to the diaphragm frame,
the diaphragm frame has an opening in which the engaging unit is inserted,
the engaging unit is to deform in a course of being inserted in the opening and engage with an edge of the opening due to a restoration from deformation,
the diaphragm-mechanism cover has a rib protruding toward the opening, and
when the diaphragm mechanism and the diaphragm-mechanism cover are attached to the lens barrel, the rib is positioned in a direction of the engage unit deforming and in a position close to the engage unit.

6. A lens unit comprising: a fixed cylinder; a diaphragm device according to claim 1; a focus ring; and a zoom ring.

* * * * *